July 4, 1967

J. A. ENRIGHT 3,329,825

METER RELAY USING PHOTOELECTRIC RELAY ELEMENTS
CONTROLLED BY AN ANNULAR SHUTTER MOUNTED
ON THE METER MOVEMENT ASSEMBLY

Filed May 11, 1964

INVENTOR:
JOHN A. ENRIGHT

BY,

ATTORNEY

July 4, 1967
J. A. ENRIGHT
3,329,825
METER RELAY USING PHOTOELECTRIC RELAY ELEMENTS
CONTROLLED BY AN ANNULAR SHUTTER MOUNTED
ON THE METER MOVEMENT ASSEMBLY
Filed May 11, 1964
3 Sheets-Sheet 2
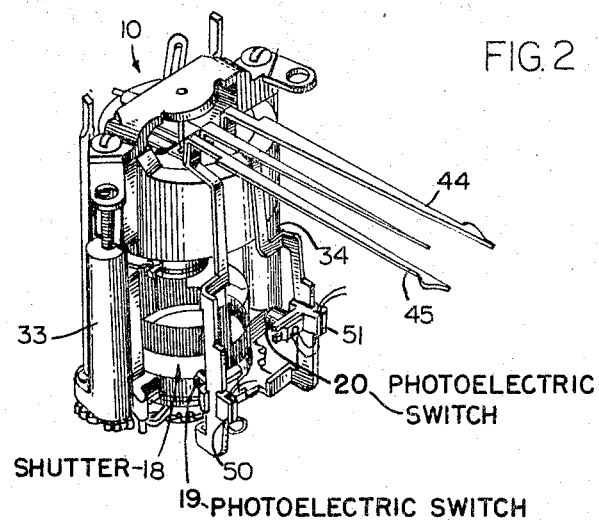
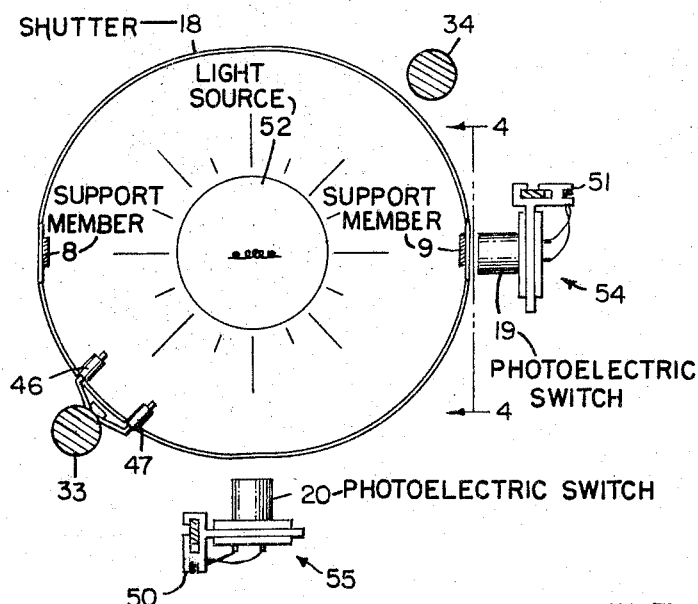
INVENTOR:
JOHN A. ENRIGHT
BY,
ATTORNEY

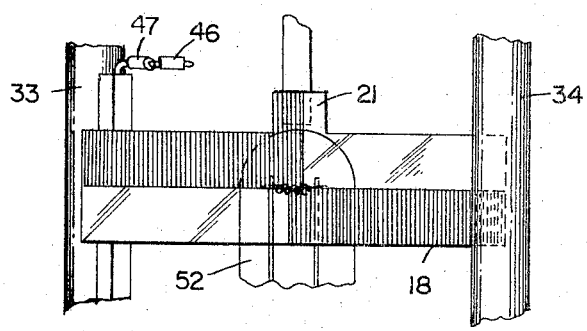
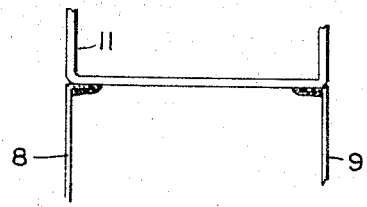
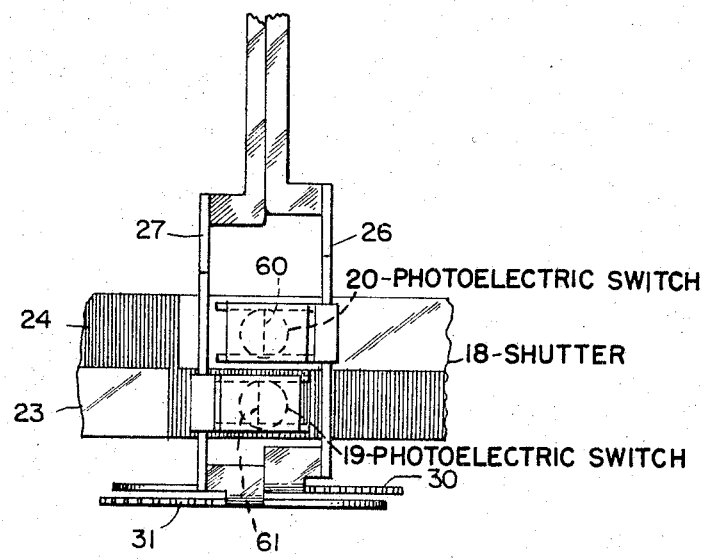

United States Patent Office 3,329,825
Patented July 4, 1967

3,329,825
METER RELAY USING PHOTOELECTRIC RELAY ELEMENTS CONTROLLED BY AN ANNULAR SHUTTER MOUNTED ON THE METER MOVEMENT ASSEMBLY
John A. Enright, Melrose, Mass., assignor to General Electric Company, a corporation of New York
Filed May 11, 1964, Ser. No. 366,426
10 Claims. (Cl. 250—231)

ABSTRACT OF THE DISCLOSURE

The disclosure reveals a meter relay in which light emanating from a source on the axis of rotation of the meter is selectively coupled to photoelectric switching devices through an annular shutter. The annular shutter is formed of a transparent material having opaque portions formed thereon and depends from the moving assembly of the meter to constitute the sole light control means in the meter relay.

This invention relates to a switching device and more particularly to a switching device of the indicating type which is capable of performing control functions in response to variations in a measured variable.

Such devices, which have become known as meter relays, have assumed increasing importance in the automatic control of industrial processes since they very conveniently perform two different functions; namely, indication and control. Meter relays utilizing photoelectric control have largely supplanted relays utilizing mechanical contacts since the use of such contacts interferes with full-scale indication of the measured variable due to the fact that the contacts generally act as physical stops on the rotation of the meter movement. Thus, the magnitude of the measured variable can only be indicated as long as the contacts remain unengaged. However, in spite of the recognized full-scale indicating ability of the light responsive relay, it has not heretofore received wide acceptance because the prior art devices having acceptable accuracy were either too bulky to permit aesthetically pleasing designs or were difficult to service and repair. On the other hand, prior art designs that were compact enough to permit more aesthetically pleasing designs did not provide acceptable accuracy and were usually difficult to service.

It is therefore an object of this invention to provide a new and improved meter relay utilizing a light responsive relay which is both accurate and compact.

It is another object of this invention to provide a new and improved meter relay utilizing a light responsive relay in which the meter movement can be removed for service and repair without dismantling or disconnecting the components of the light responsive relay.

The light responsive relay components of some prior art devices are mounted between the meter movement and the instrument cover in order to accommodate light shutters which are supported at a large radial distance from the light source to provide improved accuracy. This configuration is subject to problems generated by variations in ambient light which enter the instrument case through the window in front of the scale. Various techniques have been devised to minimize this ambient light problem which have tended to make the instrument more complex and costly to manufacture.

It is therefore an object of this invention to provide a meter relay in which the light responsive relay components are mounted behind the meter movement in a very compact arrangement thus obviating the ambient light problem without adversely affecting switching accuracy.

Light responsive relays, broadly comprise a light source, a shutter connected to rotate in unison with the coil of the meter movement, and a light responsive cell which is positioned to intercept light emanating from the light source. The light shutter is in turn positioned with respect to the light source and the light responsive cell so as to control the irradiations of the light cell in response to a rotation of the coil.

Summary

In accordance with my invention, the components of the light responsive relays are concentrically arranged about the light source which is located upon the axis of rotation of the meter coil on the opposite side of the coil from the instrument face plate.

It is another feature of my invention that the light shutter is formed in an annular configuration from a transparent material which has one or more patterns of opaque material deposited thereon. The resulting light relay is extremely compact being of the same order of magnitude as the external dimensions of the magnetic components of the meter since the shutter member is supported from the coil at two opposed points and is of substantially the same diameter as the coil.

The term "light," as utilized throughout the specification and claims, is not to be construed as being limited to visible light, but is intended to include not only the visible spectrum but also the infrared spectrum.

These and other objects and advantages of the invention will become apparent from the following description when taken in connection with the accompanying drawings. It will be understood that the drawings are illustrative only and are not to be construed as to defining the scope or limits of the invention.

Brief description of the drawings

In the drawings:
FIG. 2 is an assembled perspective view of the instrument illustrated in FIG. 1;
FIG. 3 is a plan view partially in section of the light relay portion of the instrument shown in FIG. 1 illustrating the relationship between the shutter and the light switches;
FIG. 4 is a partial elevational view taken in the direction of arrows 4—4 in FIG. 3;
FIG. 5 is a partial elevational view illustrating the position of the light switches with respect to the light shutter;
and
FIG. 6 is a sectional view showing the manner of supporting the light shutter from the coil of the meter movement.

Description of the preferred embodiment

Figure 1:
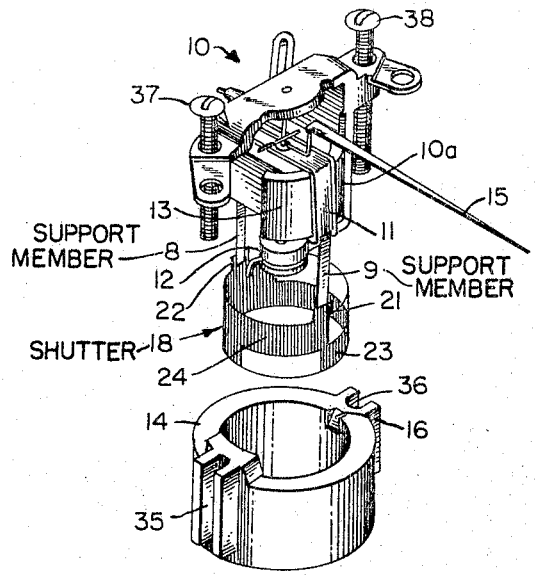
FIG. 1 is an exploded perspective view of an instrument embodying my invention.
Figure 1:
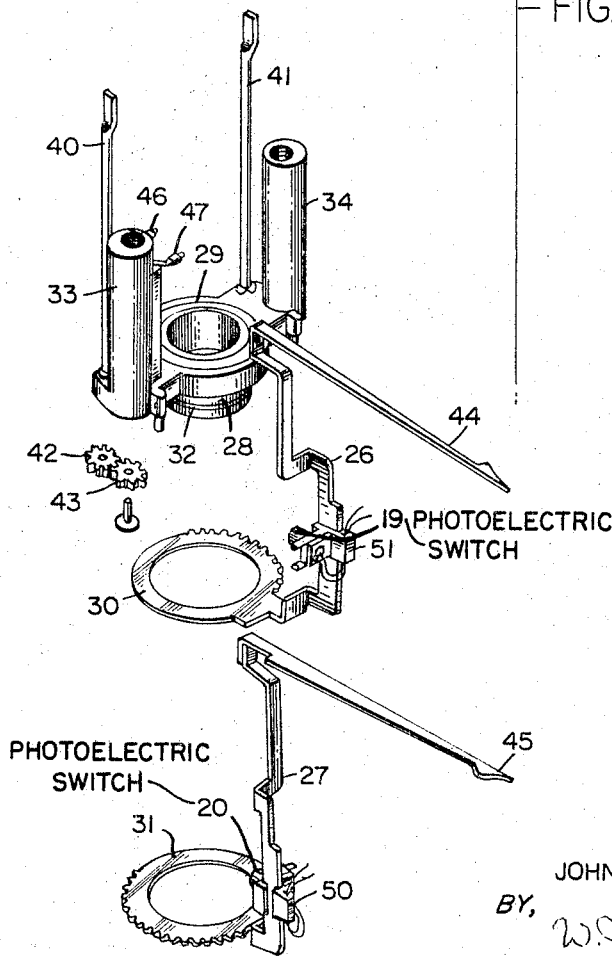

Referring to FIGS. 1 and 2, the invention is illustrated with respect to a pivot and jewel electrical instrument of the moving coil type, although it is equally applicable to moving iron type instruments. The invention can also be applied with equal facility to taut band suspension types of instruments. Therefore, I have disclosed only those details of the meter movement necessary to afford an adequate understanding of how the meter movement cooperates with the component of the light relay, in accordance with the invention.

Referring now to FIG. 1, there is disclosed a frame member 10 which supports the moving coil 11 for rotation between an upper suspension assembly (hidden) and a lower suspension assembly 12. Lower suspension assembly 12 is supported by arm 10*a* of frame 10 so that coil 11 is free to rotate in the annular gap formed between pole pieces 13 and annular flux-return member 14. Even though only one pole piece is illustrated, it will be recognized that a similarly shaped pole piece cooperates with the hidden side of coil 11 and annular member 14 to provide the requisite magnetic field for the rear side of coil 11.

Pointer 15 cooperates with coil 11, to which it is secured, and the instrument face plate, which is not illustrated for the purposes of clarity, to complete the indicating portion of the meter relay of the invention. It will be recognized that when frame 10 and the supported coil 11 of the meter are advanced into annular member 14 during assembly of the instrument, coil 11 will be spaced with respect to the inner peripheral surface of member 14 so that it will be free to rotate within the resulting annular air gap. Means is provided by slot 16 in member 14 to initially locate frame 10 with respect to annular member 14 when the lower surfaces of frame 10 come into contact with the upper surfaces of annular member 14. The final position of frame 10 may then be conventionally established by utilizing shims in the air gap.

Referring again to FIG. 1, the light relay portion of the meter relay comprises a light source (not illustrated in FIG. 1) which is coaxially arranged with respect to the axis of rotation of coil 11, a shutter 18, and associated light switches 19 and 20 which perform the desired control function. The light source has not been illustrated in FIGS. 1 and 2 in order to facilitate clarity of presentation. However, the relationship between light source 17, shutter 18, and switching devices 19 and 20 may be seen upon reference to FIGS. 3 and 4 which will hereinafter be discussed.

Means is provided by annular shutter member 18 for selectively controlling the irradiation of light switches 19 and 20 in accordance with the angular position of coil 11 with respect to the angular position of switching devices 19 and 20. Shutter 18, which is comprised of a flexible transparent material arranged in an annular configuration, is supported to rotate in unison with coil 11 by members 8 and 9. These members, which are L-shaped in configuration (see FIG. 6), may first be cemented to the lower side of coil 11 prior to its suspension so as to be in general alignment with the sides of coil 11 which will lie in the annular air gap. The opposed ends of shutter supporting members 8 and 9 may then be cemented to tabs 21 and 22 on shutter 18 so as to support shutter 18 for rotation about the axis of rotation of coil 11. It will be appreciated that since the diameter of shutter 18 is substantially equal to that of coil 11, it will be capable of passing through annular magnetic member 14 thus permitting shutter 18 and supporting members 8 and 9 to be attached to coil 11 prior to the insertion of the assembly into annular member 14. As previously indicated, this facilitates the servicing of the instrument since it permits the withdrawal of frame 10 and the supported assembly without necessitating the disconnection of shutter 18 and supporting members 8 and 9 from coil 11.

Shutter 18 may be conveniently formed of a strip of thin polyester transparent film by securing the opposed ends of the strip together to provide an annular shape. Patterns 23 and 24, which are provided upon the lower and upper halves of shutter member 18, respectively, may be conveniently provided by applying an opaque substance such as an ink or a paint to the strip prior to its formation into the annular shape. An example of a polyester film found to be suitable for shutter 18 is the film marketed by E. I. du Pont de Nemours and Company under the trademark Mylar.

Arms 26 and 27, which support light switches 19 and 20, respectively, are rotatable so that the switching devices may be moved in arcuate paths around the periphery of shutter 18. These paths have their center on the axis of rotation of coil 11 since arms 26 and 27 are carried on the periphery of annular rings 30 and 31 which are rotatably received on collar 28 of annular member 29. Annular member 29 is in turn supported coaxially with the axis of rotation of coil 11 through the cooperation of arms 33 and 34 which span the lower external surface of stationary magnetic ring 14 so that their upper surfaces may come into contact with the lower surfaces of channels 35 and 36. The assembly is then held in the position illustrated in FIG. 2 by threading bolts 37 and 38 through channels 35 and 36 into the tapped holes in the upper surface of arms 33 and 34. Rings 30 and 31 may be retained upon collar 28 in any convenient manner. For example, a C-ring (not illustrated) may be inserted in slot 32 to retain rings 30 and 31 upon collar 28.

Means is provided for adjusting the position of light switches 19 and 20 by gearing the lower ends of shafts 40 and 41 to the teeth in the periphery of rings 31 and 30. Shaft 40, the top of which is externally available on the front of the meter case for receiving a knob (not illustrated), is geared to the teeth on the periphery of ring 31 through gear 42, secured to its lower end, and idler gear 43. Shaft 41 is in like manner geared to the teeth in the periphery of ring 30 so as to permit the adjustment of the angular position of switching device 19 from the front of the meter case.

Pointers 44 and 45 are secured to the upper ends of arms 26 and 27 so as to indicate the position of the associated light switch and thus indicate, in cooperation with the scale, the magnitude of the measured variable which will result in performing the desired control action. Meter pointer 15 is positioned so as to pass slightly above the pointers 44 and 45 so that the rotation of coil 11 will not be limited other than by resilient stops 46 and 47. These stops cooperate with arms 8 and 9 to limit the rotational motion of the meter movement.

Referring now to FIG. 2, it can be seen that the resulting meter relay is very compact since the portion of the instrument lying below the plane of pointers 44 and 45 would fit within an imaginary cylinder having a radius equal to the radial distance from the axis of rotation of coil 11 to the outer surfaces of arms 33 and 34. This is not readily apparent from the drawings since the size of arms 26 and 27 have been somewhat exaggerated for the purposes of clarity of presentation. The illustrated position of the arms also makes it appear that the arms are spaced a considerable distance from the surface of shutter 18, which is not the case. In actuality, arms 26 and 27 are of such a size and are so positioned that surfaces 50 and 51 of the switching device assemblies are spaced from the axis of rotation of coil 11 approximately the same radial distance as is the outer surfaces of arms 33 and 34. Thus, a compact, generally cylindrical configuration is obtained thus rendering the meter more shock resistant and less susceptible to damage. The extreme light weight of shutter 18 and the manner in which it is supported also enhances the ruggedness of the instrument. It has been found that a shutter of sufficient rigidity can be formed from flexible 3-mil Mylar polyester film in accordance with the invention. This is accomplished by mounting the resulting relatively flexible shutter upon supporting members 8 and 9 so that it is formed into a slightly oval shape by being stretched between members 8 and 9. The normal shape of shutter 18 before it is mounted is that of a right circular cylinder. However, after it is mounted, it assumes an oval shape. For example, in the illustrated embodiment the dimensions between tabs 21 and 22 are increased 25 thousandths of an inch from its dimensions when in its "round" condition. It has been found that the tension created by stretching shutter 18 between these supporting members is sufficient to permit the construction of a rigid shutter from a thin flexible material. Furthermore, it has been found that due to the uniform cross-sectional area of the transparent film there is no problem of the type associated with obtaining a symmetrical shutter from a metallic element of stepped configuration. It has been found to be very difficult to form and support such a shutter with any degree of uniformity upon a production basis. This has been one of the difficulties of the prior art designs.

The positions of resilient stops 46 and 47 relative to support members 8 and 9 are illustrated in FIG. 3. It is another feature of my invention that members 8 and 9 not only serve to support shutter 18 but also cooperate with stops 46 and 47 to provide the necessary limitation upon rotational motion of coil 11.

Referring again to FIG. 3, it can be seen that the surface of shutter 18 is closest to light switch 19 when in the illustrated position. Consequently, the line of transition between the opaque and transparent areas of pattern 24 in proximity to member 9 will be nearest to slit 60 (see FIG. 5) in the mask of switching device 19 when in this position, thus providing good switching accuracy. It will also be clear that if coil 11 rotates clockwise approximately 90° from the position illustrated in FIG. 3, it will bring the transition line between transparent and opaque areas of pattern 23 into alignment with slit 61 in the mask of light switch 20. Thus, in accordance with the invention, the thin flexible shutter 18 is supported and shaped with respect to its patterns and the switching devices so that the surface of the shutter will be in close proximity to a switching device only when pointer 15 is in the region of the corresponding one of the set pointers.

Referring now to FIG. 4, light source 52 is supported in any convenient manner within the aperture in annular member 29 so that the light radiating portion thereof lies in the plane which preferably intersects shutter 18 at the juncture of patterns 23 and 24.

FIG. 5 illustrates the positions of the switching assemblies 54 and 55 when arms 26 and 27 come into contact with each other. Under this condition, set pointers 44 and 45 are separated by approximately 2% of full scale and slits 60 and 61 are in approximate alignment with each other.

Means is provided by assemblies 54 and 55 for permitting the adjustment during manufacture of the transverse and longitudinal positions of switching devices 19 and 20 with respect to patterns 24 and 23 so that switching takes place when pointer 15 is in exact alignment with the corresponding set pointer. Each holder comprises a device-supporting base member having channels in two opposed sides thereof which cooperate with the arms of the supporting bracket for permitting longitudinal adjustment of the switching devices. The brackets are in turn slidably received upon arms 26 and 27 to permit adjustment of the switching devices transverse to the patterns. Once these factory adjustments are completed the assembly is cemented in the resulting position.

It is another important feature of this design that the formation of shutter 18 from transparent material of constant cross-section permits the selection during manufacture of any one of four different combinations of control action merely by selecting, from four interchangeable shutters, a shutter with the desired pattern printed thereon. These shutters, which have four different patterns, are otherwise identical in size and shape thus permitting them to be assembled and supported in exactly the same manner. This is not possible with prior art stepped-design shutters made of opaque material since the transverse alignment of two "transparent" areas creates problems in shutter design necessitating more complex shapes. This, in turn, necessitates different supporting techniques which depend upon the shape of the shutter to be supported. Thus, the prior art devices cannot take advantage of the benefits which accrue when parts and assembling techniques may be standardized for all models, as in the case with my invention.

Further simplification is obtained by utilizing three electrode semiconductor light switches for light switches 19 and 20. These devices, which are a form of SCR, are silicon PNPN switches in which gating is done both by light and by the electrical bias at the gate terminal. This provides greater stability and permits electrical adjustment of the light sensitivity. When such devices are utilized they can be connected in series with the winding of the relay which performs the control function to directly control its energization. Such devices are sold by Solid State Products, Inc., Salem, Massachusetts, under the trademark Photran.

While only a single embodiment of the subject invention has been shown and described herein, it is in the nature of description rather than limitation and it will occur to those skilled in the art that various changes, modifications, and combinations may be made within the province of the appended claims without departing either in spirit or scope from this invention in its broader aspects.

What I claim as new and desire to secure by Letters Patent of the United States is:

1. A switching device comprising a meter having a rotatable coil,
   a light source mounted on the axis of rotation of said coil,
   shutter means consisting of an annular shutter supported from said coil at diametrically opposed support points so as to cause said shutter to rotate about said axis in response to rotation of said coil,
   said shutter being formed of transparent material of substantially constant cross-section having opaque material deposited upon portions thereof to form a pattern of transparent and opaque areas,
   a light responsive switching device positioned adjacent the periphery of said shutter,
   said switching device being positioned so that said pattern is interposed between said light source and said switching device so as to cause the switching of said switching device in response to said coil going through a predetermined position,
   said pattern being positioned with respect to said opposed support points so that a line of transition between opaque and transparent areas is in substantial alignment with one of said opposed points,
   the distance between said light responsive switching device and said shutter member being small as compared to the distance between said light source and said switching device,
   when the former is in radial alignment with said transition line.

2. The combination of claim 1 in which said shutter material is flexible, said material being placed in tension when supported from said coil at said opposed points so that it assumes a slight oval shape to prevent said shutter from coming into contact with said switching device at points between said opposed support points.

3. The combination of claim 2 further comprising a pointer connected to said coil at one end thereof to rotate about said axis, said means for supporting said shutter comprising first and second members connected to said coil at the other end thereof and to said shutter at said opposed support points.

4. The combination of claim 3 in which said meter has a stationary magnetic component having an aperture therein which generally forms the outer peripheral confines of the air gap in which said coil is supported, the diameter of said shutter being less than the diameter of said aperture so as to permit the coil and attached shutter to be withdrawn from said magnetic component without being disassembled.

5. The combination of claim 4 in which said switching device is composed of a semiconducting device and is positioned by means supported from said stationary magnetic component, said positioning means being adjustable so that said switching device may be moved in an arcuate path around the periphery of said shutter, said arcuate path having its center on said axis.

6. The combination of claim 5 in which said positioning means comprises an element having first and second legs extending from said magnetic component in spaced parallel alignment so as to straddle said shutter, said arms terminating in an annular member having a collar for rotatably receiving an annular ring which carries on its periphery an arm for supporting said switching device.

7. The combination of claim 6 further comprising means for supporting said light source within said annular shutter, said annular ring having teeth thereon, said positioning means further comprising a shaft available on the front of the meter and geared to the teeth on said annular ring for permitting the adjustment of the annular position of said switching device.

8. The combination of claim 7 further comprising means resiliently supported by one of said arms for limiting in cooperation with said first and second members the rotational movement of said coil and shutter.

9. The combination of claim 8 further comprising a second light responsive switching device, said shutter having a second pattern thereon, said second pattern and second switching device being laterally displaced in a direction along said axis from the other pattern and the first switching device.

10. The combination of claim 9 in which said shutter is formed from a clear polyester film having an aluminum coating deposited on selected areas to form said patterns.

References Cited
UNITED STATES PATENTS

| 2,236,255 | 3/1941 | Young | 200—61.02 X |
| 3,054,928 | 9/1962 | Schrenk et al. | 324—99 X |
| 3,240,946 | 3/1966 | Triplett | 250—231 |

RALPH G. NILSON, *Primary Examiner.*

J. D. WALL, *Assistant Examiner.*